Nov. 8, 1949     E. H. SCHANZLIN     2,487,732
PUMP—PRESSURE LOADED—WITH UNLOADING RELIEF VALVE
Filed Feb. 19, 1948     2 Sheets-Sheet 2
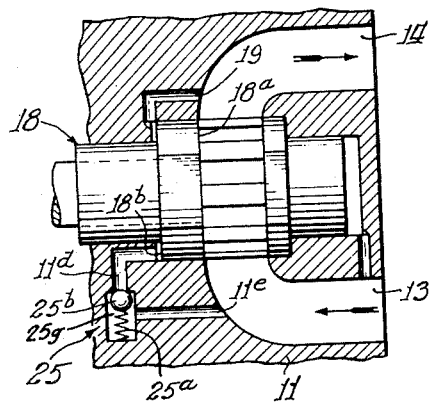
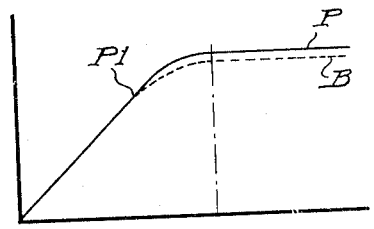
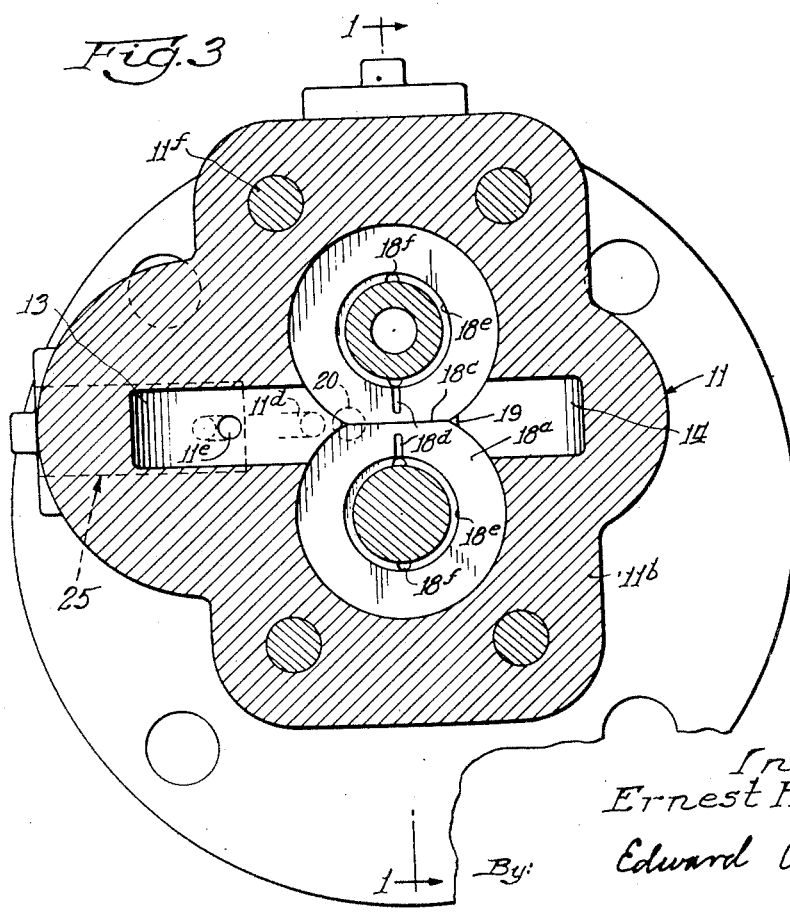
Inventor:
Ernest H. Schanzlin
By: Edward C. Gritzbaugh Patented Nov. 8, 1949

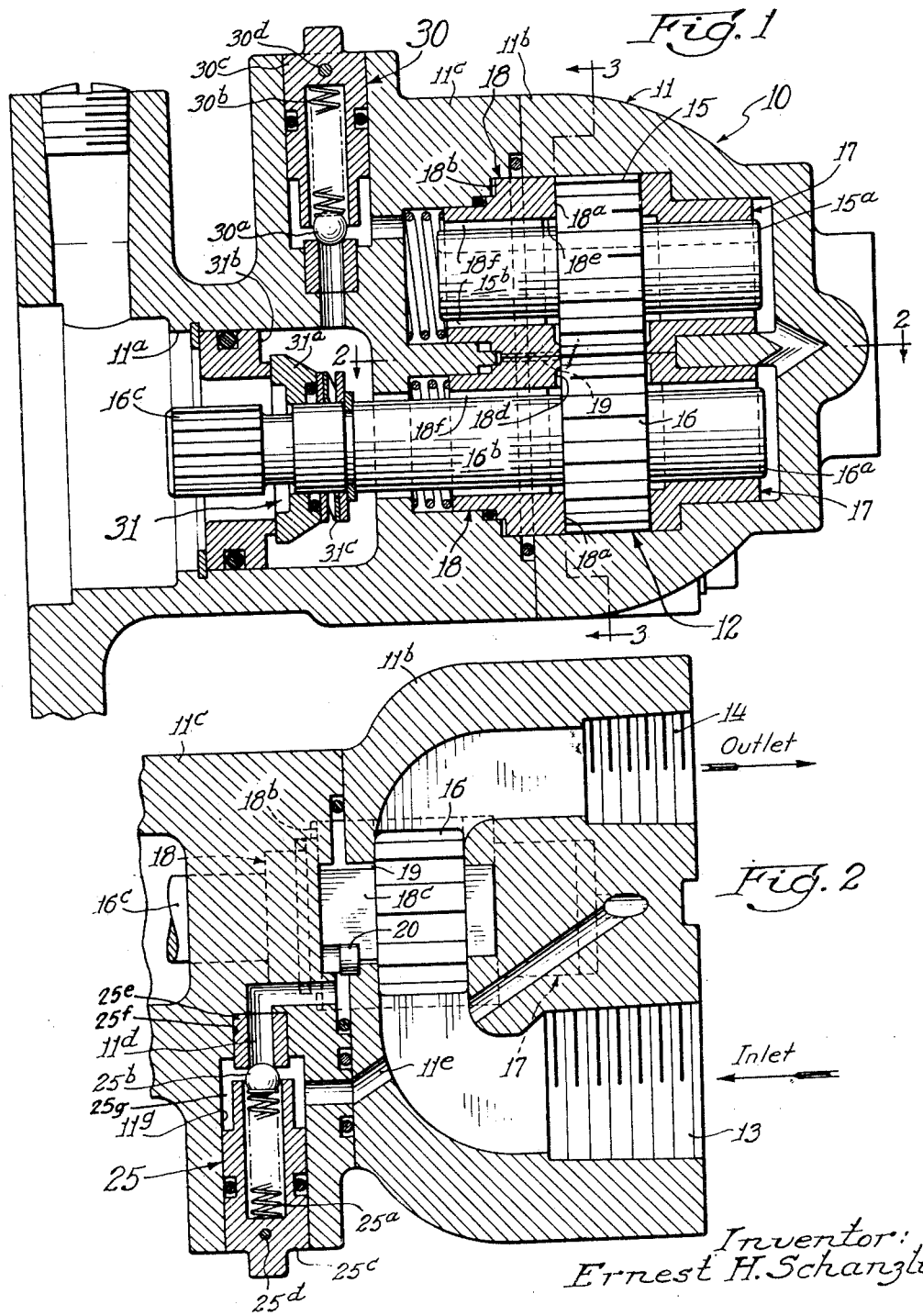

2,487,732

UNITED STATES PATENT OFFICE 2,487,732

PUMP—PRESSURE LOADED—WITH UNLOADING RELIEF VALVE

Ernest H. Schanzlin, Cleveland, Ohio, assignor to Borg-Warner Corporation, Chicago, Ill., a corporation of Illinois Application February 19, 1948, Serial No. 9,354

3 Claims. (Cl. 103—126)

This invention relates to liquid pressure generators or pumps, and particularly to positive fixed displacement intermeshing gear type pumps including axially adjustable end plate or bushing means effective when in engagement with the side faces of the gears to provide a pumping seal therewith and being held in such position by liquid pressure generated by the corresponding gears.

In certain installations it has been found important to provide an arrangement for limiting the top pressure that the gear pump can generate irrespective of the speed at which the pump may be driven, an example of such an installation being that for supplying pressure fluid for feathering aircraft propellers. Prior to the present invention it has been the common practice to provide an unloading valve arrangement operable to divert the entire output of pressure liquid delivered by the pump when the pressure rises above a predetermined maximum value. This solution to the problem has necessitated the use of a large unloading valve of sufficient capacity to handle all or a major portion of the pump output volume. The provision of a valve of such large capacity involves excessive manufacturing costs and other disadvantages, which are overcome by the present arrangement.

It is an object of this invention to provide a working pressure liquid generator of the fixed displacement intermeshing gear type having bushing means engaging the gear side faces for providing a pumping seal, this bushing means being held in pumping seal engagement by means of the liquid pressure generated by the gears and being further particularly characterized by the provision of a pilot control valve assembly responsive to the occurrence of a bushing actuating pressure of a predetermined maximum value for preventing the development of any higher bushing actuating pressure while maintaining said maximum value of pump output pressure.

Other and more specific objects and advantages of the present invention will become apparent from a reading of the following specification taken in connection with the appended drawings forming a part thereof and wherein:

Fig. 1 is an axial cross section view of a preferred form of pressure generating arrangement, taken substantially on the line 1—1 of Fig. 3 and bringing out to advantage the structural formation of the bushings that provide the pumping seal with the gear side faces;

Fig. 2 is a broken away sectional view taken substantially along the line 2—2 of Fig. 1 bringing out to advantage the arrangement of the pilot control valve effective to relieve pressures in excess of a predetermined value of pressure from communication with the back side of the pressure loaded bushings;

Fig. 3 is a cross sectional view taken substantially on the line 3—3 of Fig. 1 bringing out to advantage the construction of the front or gear engaging faces of the bushings as well as the manner in which the pressure from the output side of the gears is directed to the back faces of the bushings for the purpose of pressure loading the same to provide the pumping seal;

Fig. 4 is a simplified schematic view intended to bring out even more clearly the manner in which the pressure loading of the bushings is effected and particularly the arrangement of the pilot control valve for assuring that the pressures in excess of a predetermined maximum value are relieved from the pressure loaded side of the bushings; and Fig. 5 presents comparative curves bringing out the relationship of the pressure generated by the gears to the pressure acting on the rear faces of the bushings as the rate of rotation is increased, revealing clearly that these two values of pressure remain the same until the predetermined maximum value of output pressure has been reached whereupon the pilot control valve begins to open and relieve any further development of increased pressure acting on the rear face of the bushings.

Referring in greater detail to the figures of the drawings, a gear pump indicated generally at 10, illustrating a preferred embodiment of the present invention, includes essentially an enclosing housing 11 formed with a pump chamber indicated generally at 12 having an inlet 13, an outlet 14 and containing a pair of intermeshing gears 15 and 16 effective when driven to continuously move liquid from inlet 13 out of outlet 14. Housing 11 is preferably made up of two sections, 11b and 11c, held together by suitable fastening means 11f for facilitating assembly and disassembly. Each of the gears are provided with axially oppositely extending journals 15a, 15b, 16a, 16b, journal 16b extending outwardly and terminating in a driving coupling connector 16c. Stationary bushings indicated generally at 17 engage the gear side faces on one side for the purpose of providing a pumping seal and bearing for the journals 15a and 16a, while bushings indicated generally at 18 engage the opposite gear side faces for the purpose of providing a pumping seal and bearing for journals 15b and 16b, these latter bushings being arranged to be pressure loaded and controlled in a special manner forming the particular subject matter to which the present invention is directed.

Referring particularly to Figs. 2, 3 and 4 it will be seen that bushing front faces 18a are normally held in pumping seal engagement with the adjacent side faces of the corresponding gears by means of pressure generated by the gears and acting on rear pressure responsive motive surfaces 18b, this pump output pressure being directed to the rear faces 18b through axially extending passage 19. With reference to Fig. 3 it will be seen that passage 19 is defined by the wall of housing 11 and the adjacent converging portions of the radial flanges of the bushings, on the outlet side of the gears. The opposite corresponding area of convergence between the upper and lower bushing flanges that would normally provide a passage placing the rear faces of the bushings in communication with the low pressure side of the gears is closed by a plug 20.

Particular attention is directed to the pilot control valve arrangement indicated generally at 25 and functioning to maintain pressure on rear pressure responsive surfaces 18b of the bushings, up to a selected predetermined maximum value of pressure. Upon the generation of this pressure value, this pilot control valve will begin to open and thereby prevent the building up of any higher pressure acting on rear surfaces 18b. The exact value of pressure above which pilot control valve 25 will begin to open may be readily controlled by the choice of coil compression spring 25a functioning to urge the ball check valve 25b into engagement with the valve seat. It will be noted that ball check valve 25b is seated against the direction of flow of fluid from passage 11d in communication with the rear pressure responsive surface 18b of the bushings, the outlet side of ball check valve 25b communicating through passage 11e with pump inlet 13. Passage 11e serves to place the bushing outer terminals in communication with the low pressure inlet 13. Pilot control valve 25 preferably comprises the hollow closure plug 25c confined within housing bore 11g by a pin 25d. One end of coil compression spring 25a is disposed in plug 25c in engagement therewith, the other end of spring 25a engaging ball check valve 25b and urging the same into contact with the valve seat, which comprises the lower end of sleeve insert 25e. Sleeve insert 25e is mounted in a suitably enlarged portion 25f of passage 11d, and the lower end of the sleeve extends slightly into the upper portion of housing bore 11g. It will be noted, too, that the upper portion of closure plug 25c is substantially reduced in outer diameter, thereby to define with the upper portion of housing bore 11g and the extended portion of sleeve insert 25e a substantially annular valve chamber 25g, with which the left end, as viewed in Fig. 2, of passage 11e communicates. It will be understood that closure plug 25c may be arranged in any other desired manner such, for example, as in threaded relationship with housing bore 11g for the purpose of adjusting the compression of spring 25a to vary the top discharge pressure of the pump.

Referring to Fig. 5 it will be seen that as the rate of rotation of the pump is increased and the generated outlet pressure rises, the pressure curve B indicating the pressure acting on motive surface 18b of the bushings coincides with the output pressure curve P until a selected value of output pressure has been generated, this point being indicated at P1. Any tendency for the pressure acting on the rear faces 18b of the bushings to rise above this value is counteracted by the opening of pilot control valve 25 and hence the output pressure P is correspondingly limited to a definite maximum value not appreciably above that value of pressure at which the pilot valve begins to open. While the upper portion of the curve P is shown slightly above the corresponding portion of curve B for purposes of illustrating the relationship, it will be realized that pressure P can never have any appreciable value above that of pressure B. This is necessarily the case since the generation of pressure P depends upon the effectiveness of pressure B in holding the bushings in pressure sealing relationship with the corresponding gear side faces.

The present invention may be considered a special application or improvement over Lauck et al. Patent No. 2,420,622; Lauck Patent No. 2,437,791; and Wichorek pending application 687,379 filed July 31, 1946, now Patent No. 2,472,031 issued May 31, 1949, and reference may be had thereto for a more detailed understanding of the respective features claimed therein, the same being described here in detail only to the extent necessary for an understanding of the present invention.

Relief valve assembly 30 functions to maintain a small differential of pressure on seal assembly 31, the occurrence of any pressure above this value operating to cause ball check valve 30a to open and relieve any such excess pressure. Coil compression spring 30b is selected in accordance with the desired pressure to be maintained on seal assembly 31 and is received within tubular closure 30c held in position by any suitable means such as, for example, pin 30d.

Seal assembly 31 may be of any suitable form effective to provide a rotary seal. This assembly is illustrated as being composed of a flange member 31a carried by journal extension 16b having a radial forward face held in fluid seal engagement with a corresponding face on insert shoulder 31b mounted in housing opening 11a, by means of a compression spring 31c.

The gear face engaging surfaces 18a are formed with radially extending depressions 18d for preventing entrapment of the liquid being pumped. Relief recesses 18e are placed in communication with the low pressure area through axially extending channels 18f. The relative areas of pumping seal providing surfaces 18a and pressure responsive surface 18b are so arranged that as long as the pressure generated by the pump does not exceed the value of pressure for which pilot control valve 25 is set, the bushings 18 will be held in pumping seal engagement with the gear side faces, while any tendency to generate a higher pressure results in faces 18a moving axially away from the corresponding gear side faces sufficiently to prevent any such increase in generated pressure.

While the present invention has been described in connection with a specific embodiment thereof it is to be understood that this is by way of example rather than by way of limitation and that the invention is to be defined by the appended claims which should be given a scope commensurate with the prior art.

I claim:

1. In a pump of the class described, a housing having an inlet and an outlet aperture formed therein, a pair of intermeshing gears for pumping liquid from said inlet to said outlet apertures, movable bushings associated with said gears, a pressure loading chamber formed in said housing and having one side thereof defined by the outer side surfaces of said movable bushings so that pressure in said chamber is exerted against said bushings, tending to move said bushings into sealing engagement with said gears, a conduit connecting said chamber to the outlet side of said pump to admit liquid under pumping pressure to said chamber, and means for controlling the loading pressure in said chamber comprising means defining a second conduit connecting said chamber to the inlet side of said pump, a ball check valve disposed in said conduit so as to open in response to pressure applied from said chamber, and resilient means for holding said valve in closed position.

2. In a pump of the class described, a housing having an inlet and an outlet aperture formed therein, a pair of intermeshing gears for pumping liquid from said inlet to said outlet apertures, movable bushings associated with said gears, a pressure loading chamber formed in said housing and having one side thereof defined by the outer side surfaces of said movable bushings so that pressure in said chamber is exerted against said bushings, tending to move said bushings into sealing engagement with said gears, a conduit connecting said chamber to the outlet side of said pump to admit liquid under pumping pressure to said chamber, and means for controlling the loading pressure in said chamber comprising means defining a second conduit connecting said chamber to the inlet side of said pump, a ball check valve disposed in said conduit so as to open in response to pressure applied from said chamber, resilient means for holding said valve in closed position, and means for adjusting the pressure exerted by said resilient means on said valve.

3. In a pump of the class described, a housing having an inlet and an outlet aperture formed therein, a pair of intermeshing gears for pumping liquid from said inlet to said outlet apertures, movable bushings associated with said gears, a pressure loading chamber formed in said housing and having one side thereof defined by the outer side surfaces of said movable bushings so that pressure in said chamber is exerted against said bushings, tending to move said bushings into sealing engagement with said gears, a conduit connecting said chamber to the outlet side of said pump to admit liquid under pumping pressure to said chamber, and means for controlling the loading pressure in said chamber comprising means defining a passage connecting said chamber to the inlet side of said pump, said passage including a bore formed in said housing, a portion of said bore comprising a valve chamber, a first conduit connecting at one end to said loading chamber and at its other end to said valve chamber and a second conduit connecting at one end to said valve chamber and at its other end to the inlet side of said pump, a sleeve insert disposed in said first conduit, a portion of said insert extending into said valve chamber, the extended portion of said insert defining a valve seat, a hollow closure plug mounted in said bore and having one end of reduced outside diameter terminating adjacent but in spaced relation to the extended portion of said insert, a ball check valve carried by said plug, and resilient means in said plug for urging said valve against said valve seat.

ERNEST H. SCHANZLIN.

REFERENCES CITED

The following references are of record in the file of this patent:

UNITED STATES PATENTS

| Number | Name | Date |
| --- | --- | --- |
| 1,944,648 | Saussard | Jan. 23, 1934 |
| 2,437,791 | Roth et al. | Mar. 16, 1948 |